United States Patent [19]

Schäfer et al.

[11] Patent Number: 4,619,966
[45] Date of Patent: Oct. 28, 1986

[54] PROCESS FOR THE PRODUCTION OF COATED SUBSTRATES

[75] Inventors: Walter Schäfer; Manfred Hajek, both of Cologne; Hanns P. Müller, Odenthal; Rolf Dhein, Krefeld; Rolf Küchenmeister, Krefeld; Armin Sickert, Krefeld, all of Fed. Rep. of Germany

[73] Assignee: Bayer Aktiengesellschaft, Leverkusen, Fed. Rep. of Germany

[21] Appl. No.: 795,965

[22] Filed: Nov. 7, 1985

[30] Foreign Application Priority Data

Nov. 16, 1984 [DE] Fed. Rep. of Germany ....... 3441934

[51] Int. Cl.$^4$ ............................................. C08L 75/04
[52] U.S. Cl. .................................. 524/589; 252/182; 427/385.5; 427/389.7; 524/591; 524/872; 524/873; 524/874
[58] Field of Search ............... 524/589, 591, 872, 873, 524/874; 252/182; 427/385.5, 389.7

[56] References Cited

U.S. PATENT DOCUMENTS

| | | | |
|---|---|---|---|
| 3,388,087 | 6/1968 | Dieterich et al. | 260/29.2 |
| 3,461,103 | 8/1969 | Keberle | 260/75 |
| 3,479,310 | 11/1969 | Dieterich et al. | 260/29.2 |
| 3,480,592 | 11/1969 | Dieterich et al. | 260/77.5 |
| 3,686,108 | 8/1972 | Rolf | 260/29.2 |
| 3,756,992 | 9/1973 | Dieterich | 260/77.5 |
| 3,905,929 | 9/1975 | Noll | 260/29.2 |
| 4,465,825 | 8/1984 | Lin | 528/367 |

FOREIGN PATENT DOCUMENTS

| | | |
|---|---|---|
| 912090 | 5/1954 | Fed. Rep. of Germany . |
| 891539 | 3/1944 | France . |
| 1148244 | 4/1969 | United Kingdom . |

OTHER PUBLICATIONS

Polymer Science Technology, "New Polymers Prepared from N-Cyanourea Compounds", Shiow C. Lin, Author, 1984, vol. 25, pp. 103–112.
Angew. Chem. 82, (1970) International Edition.

Primary Examiner—Maurice J. Welsh
Attorney, Agent, or Firm—Gene Harsh; Joseph C. Gil; Thomas W. Roy

[57] ABSTRACT

The present invention is directed to a process for the production of water- and solvent-resistant coated substrates by coating heat-resistant substrates with a solution or dispersion of an anionic group-containing polyisocyanate addition product in an aqueous solvent or dispersant and subsequently thermally treating the coating at a temperature of about 60° to 200° C., with evaporation or vaporization of the solvent or dispersant and simultaneous crosslinking of the polyisocyanate addition product which has been applied to the substrate, characterized in that incorporated anionic structural units corresponding to the formula

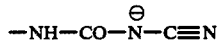

are used in a quantity of about 5 to 1000 milliequivalents per 100 g of solids and the solids are based on reaction products of organic polyisocyanates with salts of cyanamide and bases selected from ammonia, primary and secondary amines having a minimum pKb value of 3.1, tertiary amines and mixtures thereof. The present invention also relates to the aqueous solutions or dispersions of anionically-modified polyisocyanate addition products.

7 Claims, No Drawings

PROCESS FOR THE PRODUCTION OF COATED SUBSTRATES

BACKGROUND OF THE INVENTION

1. Field of the Invention

The present invention relates to a new process for the production of water- and solvent-resistant coated substrates by coating substrates with solutions or dispersions of particular anionically-modified polyisocyanate addition products in an aqueous solvent or dispersant and subsequently thermally treating the resulting coating. The present invention also relates to the aqueous solutions or dispersions of anionically-modified polyisocyanate addition products.

2. Description of the Prior Art

Aqueous solutions or dispersions of anionically-modified polyisocyanate addition products, particularly aqueous dispersions of anionically-modified polyurethanes or polyurethane-polyureas and the use thereof for the production of coatings are already known (c.f., for example, DE-PS No. 1,184,946, DE-PS No. 1,178,586, DE-AS No. 1,237,306, DE-OS No. 1,495,745, DE-OS No. 1,595,602, DE-OS No. 1,770,068, DE-OS No. 2,019,324, DE-OS No. 2,314,512 or D. Dieterich et al., Angew. Chem. 82, 53 (1970)).

The dispersibility of the polyisocyanatepolyaddition products contained in these dispersions is based on the presence of incorporated ionic centers, particularly incorporated sulphonate or carboxylate groups. In the production of coated substrates from these dispersions, the ionic centers generally remain in the resulting coated substrates, thereby reducing the water resistance of the resulting coating.

Thus, an object of the present invention is to provide a new process for the production of coated substrates using aqueous solutions or dispersions of anionically-modified polyisocyanate addition products which does not suffer from this serious disadvantage.

This function can be achieved by the process according to the invention which is described in more detail in the following.

SUMMARY OF THE INVENTION

The present invention is directed to a process for the production of water- and solvent-resistant coated substrates by coating heat-resistant substrates with a solution or dispersion of an anionic group-containing polyisocyanate addition product in a aqueous solvent or dispersant and subsequently thermally treating the coating at a temperature of about 60° to 200° C., with evaporation or vaporization of the solvent or dispersant and simultaneous cross-linking of the polyisocyanate addition product which has been applied to the substrate, characterized in that incorporated anionic structural units corresponding to the formula

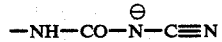

are used in a quantity of about 5 to 1000 milliequivalents per 100 g of solids and the solids are based on reaction products of organic polyisocyanates with salts of cyanamide and bases selected from ammonia, primary and secondary amines having a minimum pKb value of 3.1 which are volatile under the conditions of the thermal treatment, tertiary amines which are volatile under the conditions of the thermal treatment and mixtures of these bases. The present invention also relates to the aqueous solutions or dispersions of anionically-modified polyisocyanate addition products.

DETAILED DESCRIPTION OF THE INVENTION

DE-PS No. 912,090 indeed already describes the reaction of organic polyisocyanates inter alia with salts of cyanamide and tert. amines, optionally in aqueous media, but this prior publication does not mention the use of volatile bases to form salts with cyanamide (alkali metal or alkaline earth metal salts of cyanamide preferably being used), nor the use of the mentioned aqueous solutions for the production of coated substrates as defined by the present invention.

The solutions or dispersions used in the process according to the invention contain (a) water or a mixture of water and organic solvents, the mixture containing a minimum quantity of about 50% by weight of water:

(b) reaction products of organic polyisocyanates and salts of cyanamide and certain selected bases of the type described in more detail in the following; the reaction products contain a quantity of incorporated anionic structural units corresponding to the formula

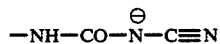

of about 5 to 1000, preferably about 50 to 500 milliequivalents per 100 g of solids, and the solutions or dispersions have a solids content of these reaction products of about 5 to 95%, preferably about 20 to 80%, by weight, and optionally, (c) conventional auxiliaries and additives known from coating technology.

The solvent or dispersant (a) may be pure water or a mixture of water and solvent. Suitable solvents are particularly water-miscible solvents such as acetone, methanol, ethanol, methyl ethyl ketone, N-methyl pyrrolidone, tetrahydrofuran or inherently water-incompatible solvents such as ethyl acetate, n-butanol or toluene. If such inherently water-immiscible solvents are used, the quantity thereof has to be limited so that homogeneous solutions or dispersions of polyisocyanate addition products are produced. Larger quantities of such solvents (if they have been previously used for the production of the addition products) are removed by decanting (from the insoluble addition product) or by distillation (from the solution or the dispersion).

The components (b) in question are reaction products of organic polyisocyanates with certain salts of cyanamide.

The following are examples of polyisocyanates suitable for the production of these polyisocyanate addition products.

(i) Simple organic polyisocyanates having a molecular weight of 168 to about 300 such as 1,6-diisocyanatohexane, 1-isocyanato-3,3,5-trimethyl-5-isocyanatomethyl-cyclohexane, 2,4- and/or 2,6-diisocyanatotoluene, 4,4'- and/or 2,4'-diisocyanatodiphenylmethane or 4,4'-diisocyanato-dicyclohexylmethane. These simple diisocyanates are, however, less preferably used.

(ii) Modified "lacquer polyisocyanates" having an (average) molecular weight of up to about 1000, that is the known biuret, isocyanurate, uretdione or oxadiazinetrione group-containing polyisocyanates based on the simple diisocyanates given in (i), such as tris-(6-isocyanatohexyl)-biuret or mixtures with the higher homologs thereof and tris(6-isocyanatohexyl)-isocyanurate or mixtures with the higher homologs thereof and optionally with bis-(6-isocyanatohexyl)-uretdione or bis-(6-isocyanatohexyl)-oxadiazinetrione.

(iii) Relatively high molecular weight NCO prepolymers based on the polyisocyanates given in (i) and (ii) and polyhydroxyl compounds having a molecular weight of 62 to about 4000, preferably 62 to about 2500, known from polyurethane chemistry. Examples include reaction products of the polyisocyanates given, for example, in (i) and (ii) with subequivalent quantities of simple polyvalent alcohols such as ethylene glycol, propylene glycol, trimethylol propane and/or glycerine; ether group-containing polyvalent alcohols such as diethylene glycol, dipropylene glycol, tripropylene glycol, tetrapropylene glycol; relatively high molecular weight polyether polyols obtained by alkoxylating suitable starting molecules such as the aforementioned simple polyvalent alcohols with ethylene oxide and/or propylene oxide; or polyester polyols obtained by reacting polybasic acids or the anhydrides thereof such as adipic acid, phthalic acid, tetrahydro-phthalic acid, hexahydrophthalic acid and maleic acid, optionally in admixture with minor quantities of monobasic acids such as benzoic acid or fatty acids with excess quantities of polyvalent alcohols, particularly the aforementioned ether group-free simple alcohols. In the production of these NCO prepolymers, the polyisocyanates or mixtures of these polyisocyanates are reacted with subequivalent quantities of the polyhydroxyl compounds or mixtures thereof at an NCO/OH equivalent ratio of about 1.2:1 to 8:1, preferably about 1.5:1 to 3:1. The "prepolymers", as apparent from the NCO/OH equivalent ratio may also be "semi-prepolymers," i.e. mixtures of excess unreacted starting polyisocyanate with urethane group-containing NCO prepolymers. Such "semi-prepolymers" can be used in the production of the polyisocyanate adducts to be used according to the invention.

It is also fundamentally possible to use ionically-modified structural components of a type known from polyurethane dispersion chemistry in the production of the polyisocyanate addition products, in order to produce polyisocyanate-addition products which contain incorporated carboxylate or sulphonate groups in addition to the anionic structural units corresponding to the above general formula which are essential to the invention. It is also possible to employ NCO prepolymers which are produced by using carboxylate or sulphonate group-containing polyvalent alcohols or by using the corresponding hydroxycarboxylic acids or hydroxysulphonic acids with subsequent neutralization of the acid groups. The simultaneous use of such anionic structural components is, however, less preferred since on one hand the hydrophilic nature of the anionic structural unit which is essential to the invention is generally sufficient to dissolve or disperse the polyisocyanate addition products, and on the other hand, the simultaneous use of such anionic structural components means that there will still be incorporated anionic groups in the coated substrate finally obtained and this may defeat the purpose of the invention.

It is also possible to use organic polyisocyanates wherein the isocyanate groups are partially blocked by blocking agents for isocyanate groups such as phenol, ε-caprolactam, malonic acid diethyl ester, acetoacetic acid ethyl ester or oximes such as cyclohexanone oxime. If such partially blocked polyisocyanates are used for the production of the polyisocyanate addition products, there must be a sufficient quantity of free isocyanate groups so that a sufficient quantity of anionic structural units corresponding to the aforementioned formula are produced during the reaction with the ammonium salts of cyanamide in order to ensure the solubility or dispersibility of the polyisocyanate addition products in the solvent or dispersant. The resulting polyisocyanate addition products produced using partially-blocked polyisocyanates contain, by their very nature, blocked isocyanate groups which can contribute to even greater heat cross-linking of the coatings. However, it is not generally necessary to use partially blocked polyisocyanate-based polyisocyanate addition products in the process according to the invention since the coatings according to the invention can easily be heat-cross-linked even in the absence of blocked isocyanate groups. The polyisocyanate component used to produce the polyisocyanate addition products generally has an NCO content of about 0.2 to 50%, preferably about 4 to 25%, by weight. Whether simple polyisocyanates, lacquer polyisocyanates or NCO prepolymers are used in the production of the polyisocyanate addition products depends upon the properties desired in the coated substrates. The elasticity of the resulting coating can be increased for example, by the incorporation of elastifying relatively high molecular weight polyhydroxyl compounds into the polyisocyanate component.

The polyisocyanates are reacted with ammonium salts of cyanamide to produce the polyisocyanate addition products. These ammonium salts can be used as such or be produced in situ by simultaneously using cyanamide and suitable bases. Suitable ammonium salts of cyanamide are those based on (i) ammonia, (ii) primary or secondary amines having a minimum pKb value of 3.1 such as methylamine, dimethylamine ethylamine, tert.-butyl amine and (iii) tert. amines such as trimethylamine, triethylamine, tripropylamine, dimethylaminoethanol, N-methyl-diethanolamine or triethanolamine.

The amines in question are preferably materials which evaporate or vaporize during thermal treatment of the coated substrates produced by the process according to the invention. The decomposition (cleaving of the salt-like cyanurea-ammonium group with the release of the amine) during thermal treatment of the coated substrate is a prerequisite for the flawless chemical hardening thereof.

The polyisocyanate addition products are produced from the aforementioned starting materials at a temperature of about 0° to 80° C., preferably about 5° to 50° C., in organic or aqueous media, preferably with the production of the ammonium salts in situ in the reaction mixture used in each case. The quantity of cyanamide is calculated such that there is a molar ratio of free isocyanate groups to cyanamide of about 0.5:1 to 1.5:1, preferably about 0.8:1 to 1.2:1. The quantity of base is calculated such that there is at least 0.5 mols, preferably 1 mol, of basic nitrogen atoms for each mol of isocyanate group-reactive cyanamide. The use of an excess of amine is of course possible, but of little significance. The reaction between the isocyanate groups of the polyisocyanate component and the ammonium salts proceeds according to the following equation:

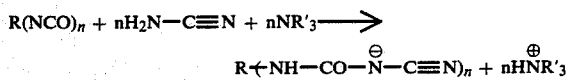

In this equation, R represents the passive radical of the n-functional polyisocyanate and R' represents hydrogen or the passive organic radical of the base.

The polyisocyanate addition products may be produced according to the following variants.

1. An organic polyisocyanate of the type given in liquid or dissolved form using an organic solvent of the aforementioned type is reacted with a mixture of cyanamide and a base with subsequent dissolution or dispersion of the reaction product (with optional removal of the solvent) in water, optionally with the subsequent removal by distillation of the solvent from the solution or dispersion.

2. An organic polyisocyanate of the type given in (i) or (ii) is mixed with a subequivalent quantity of a polyhydroxyl compound of the type given in (iii), cyanamide and a base, optionally in the presence of an inert solvent and both the NCO prepolymer and the ammonium salt from cyanamide and base are formed in situ as well as the further reaction thereof in a single-stage process with the subsequent working-up of the reaction mixture as described in 1.

3. A polyisocyanate of the type given which is optionally dissolved in an inert solvent, is added to an aqueous solution of the ammonium salt of cyanamide, optionally with the subsequent removal by distillation of the auxiliary solvent.

The alcohols which are also mentioned above in the list of suitable solvents cannot, of course, be used as solvent for the polyisocyanate component, but only as solvents for the cyanamide and the base, i.e., the ammonium salt of cyanamide. If such solutions in alcoholic solvents are reacted with the polyisocyanates, the alcoholic hydroxyl groups do not disturb the process as the salts of cyanamide are more reactive with the isocyanates than the alcoholic hydroxyl groups of the solvent.

In all the aforementioned cases, solutions or dispersions of the polyisocyanate addition products are finally produced in the aqueous or aqueous-organic solvent or dispersant. The question as to whether these are solutions or dispersions depends both on the molecular weight of the polyisocyanate used and the quantity of anionic groups contained in the reaction products. The quantity of solids contained in the solutions or dispersions, based on the aforementioned components (a) and (b), excluding the auxiliaries and additives (c) which are optionally used, is generally about 5 to 95%, preferably about 20 to 80% by weight.

The aqueous solutions or dispersions obtained in this manner can be used in the process according to the invention either as such or after admixture with further auxiliaries and additives (c).

Dyes, pigments, flow auxiliaries and similar auxiliaries and additives known from coating technology are examples of auxiliaries and additives which may optionally be used.

The aqueous solutions or dispersions optionally containing auxiliaries and additives can be applied to the substrates to be coated by the known methods used in coating technology. The substrates are then subjected to thermal treatment at a temperature of about 60° to 200° C., preferably about 80° to 180° C. Not only does evaporation and vaporization of the solvent or dispersant take place during this thermal treatment, but there is also a simultaneous chemical cross-linking of the polyisocyanate addition products with separation of the base, which, in the form of ammonium ions, provide the counter ions to the anionic structural units which are essential to the invention. There is an intermediate release of polyisocyanate addition products having terminal cyanurea groups during this thermal cross-linking, which groups further react according to the following reaction scheme with dimerization and with the formation of chain-lengthening or cross-linking n-cyanguanidine structural unit-containing products:

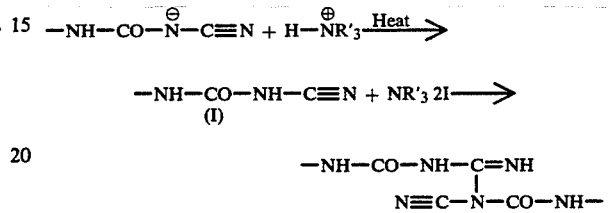

The degree of cross-linking of the coated substrates which are finally obtained can be adjusted by the functionality of the polyisocyanates used to produce the polyisocyanate addition products. If diisocyanate-based polyisocyanate addition products are used, linear end products are naturally produced, while cross-linked end products are obtained by using higher than difunctional diisocyanates.

The process according to the invention permits the production of coated substrates of the most varied types. The term "coated substrates" with regard to the present invention includes lacquer coatings on heat-resistant substrates such as metals, wood, paper, heat-resistant textiles, heat-resistant types of leather, mineral substrates and the like as well as sized glass fibers and adhesive layers on substrates to be adhered together. The present process is therefore suitable for the production of lacquer layers on coated substrates of the type given by way of example, for the currying of leather, for the production of sized glass fibers and also for the production of composite materials by adhering heat-resistant substrates such as cork or wood powder, wood shavings, glass fibers, asbestos, paper-like materials, plastics or rubber waste or ceramic materials, to themselves or to each other.

The invention is further illustrated, but is not intended to be limited by the following examples in which all parts and percentages are by weight unless otherwise specified.

EXAMPLES

Example 1

350 g of a biuret polyisocyanate based on 1,6-diisocyanato-hexane having an NCO content of 23.9% was added to 169.6 g of a polyester having a molecular weight of 1700, based on adipic acid and hexane-1,6-diol and neopentylglycol (weight ratio of the diols=11:6), and the reaction mixture was heated for 3 hours to 120° C. (NCO content=13.2%).

450 g of the reaction product (1.4 mols of NCO) were introduced at a temperature of from 0 to 10° C. into a mixture of 58.6 g (1.4 mols) of cyanamide (stabilized with 1% NaH$_2$PO$_4$) and 141 g (1.4 mols) of triethylamine in 150 ml of ethyl acetate so that the temperature did not exceed 25° C. After the resulting polyisocyanate addition product had precipitated, the mixture was subsequently stirred for a further 15 min., supernatant ethyl acetate was removed by decanting and the polyisocyanate addition product was then dissolved in 650 ml of water. The solution was freed from residual ethyl acetate on a rotary evaporator under high vacuum at room temperature. The aqueous solution which then remained had a viscosity at 22° C. of 260 mPa.s and a solids content of 50%. The dissolved polyisocyanate addition product contained 215 milliequivalents of anionic groups per 100 g of solids.

The solution of the polyisocyanate addition product was doctored onto a glass plate and the water was evaporated at 100 to 140° C. (about 15 min.). A transparent, glossy film was produced which was resistant to both boiling water and to acetone. The film withstood more than 10 rubbings with dimethyl formamide (1 kg load) without visible traces.

Example 2

8.4 g (0.2 mols) of cyanamide (stabilized with 1% NaH$_2$PO$_4$) were dissolved in 40 g of ethyl acetate and cooled to 5° C. 20.2 g (0.2 mols) of triethylamine were added and 35.2 g of the biuret polyisocyanate (0.2 mols of NCO) according to Example 1, dissolved in 40 g of ethyl acetate, were then added dropwise with cooling. After the polyisocyanate addition product had precipitated, the mixture was subsequently stirred for a further 15 mins. at room temperature. Supernatant ethyl acetate was decanted off and the residue was dissolved in 70 ml of water. After the ethyl acetate had been evaporated at room temperature under high vacuum, a clear solution was obtained which has a viscosity at 22° C. of 190 mPa.s and a solids content of 47%.

The solution was doctored onto a glass plate and the water was evaporated at 100° to 140° C. (about 15 min.). An opaque, glossy film was obtained which was resistant to both water and acetone.

Example 3

35.2 g of the biuret polyisocyanate (0.2 mols of NCO) according to Example 1, dissolved in 40 g of tetrahydrofuran, were mixed at a temperature of 0° to 10° C. with 20.2 g (0.2 mols of triethylamine, dissolved in 20 g of tetrahydrofuran). 8.4 g (0.2 mols) of cyanamide (stabilized with 1% NaH$_2$PO$_4$) was added with cooling, and 70 ml of water were then added to the reaction mixture. After the tetrahydrofuran had evaporated off at room temperature under high vacuum, a clear solution having a viscosity of 180 mPa.s at 22° C. was obtained.

The solution was doctored onto a glass plate and the water was evaporated at a temperature of 100° to 140° C. (about 15 min.). An opaque, glossy film was obtained which was resistant to both water and acetone.

Example 4

A solution of 8.4 g (0.2 mols) of cyanamide (stabilized with 1% NaH$_2$PO$_4$) in 40 g of tetrahydrofuran was cooled to 5° C. 17.8 g of 2-dimethylaminoethanol (0.2 mols) were added and then 35.2 g of the biuret polyisocyanate according to Example 1 (0.2 mols of NCO), dissolved in 40 g of tetrahydrofuran, were then added dropwise with cooling. The mixture was then stirred for a further 15 mins. 70 ml of water were added to the reaction mixture and the tetrahydrofuran was drawn off by suction on the reaction evaporator under high vacuum at room temperature. A clear, aqueous solution having a viscosity of 190 mPa.s at 22° C. was obtained.

The solution was doctored onto a glass plate and the water was evaporated at a temperature of 100° to 140° C. (about 20 min.). A clear, glossy film was obtained which was resistant to both water and to acetone.

Example 5

50 g of the biuret polyisocyanate according to Example 1 were introduced into 24.2 g of the polyester polyol according to Example 1 and the reaction mixture was heated for 3 hours to 120° C. (NCO content=13.4%). 60 g of the reaction product (0.19 mols of NCO), dissolved in 60 g of ethyl acetate, were added dropwise at 2° C. to a mixture containing 8.1 g (0.19 mols) of cyanamide (stabilized with 1% NaH$_2$PO$_4$) and 13.4 g of 24% ammonia water (0.19 mols of NH$_3$) in 80 ml of water. After the ethyl acetate had been evaporated off on a rotary evaporator under high vacuum at room temperature, a slightly milky solution was obtained which had a viscosity of 70 mPa.s at 22° C.

The solution was doctored onto a glass plate and the water was evaporated at 100° to 180° C. (about 30 min.). A clear, glossy film was obtained which was resistant to both water and to acetone.

Example 6

100 g (0.3 mols of OH) of a polyester based on adipic acid, phthalic acid anhydride, maleic acid anhydride (weight ratio in the given order=3:5:0.3), 1,2-dihydroxy-propane and trimethylol propane (weight ratio=3:2) having an OH number of 165 and an approximate molecular weight of 1000 were introduced into 100.8 g (1.2 mols of NCO) of hexamethylene diisocyanate at 120° C. and freed from excess hexamethylene diisocyanate after 45 mins. on a rotary evaporator. The residue had an NCO content of 3.6%. 100 g of this resin (0.085 mols of NCO) were introduced into a mixture containing 3.6 g (0.085 mols) of cyanamide (stabilized with 1% NaH$_2$PO$_4$) and 8.59 g (0.085 mols) of triethylamine in 40 ml of ethyl acetate and then mixed with 150 ml of water. A dispersion of a polyisocyanate addition product was obtained which contained 75 milliequivalents of anionic structural units per 100 g of solids. The dispersion had a viscosity of 140 mPa.s at 22° C., a solids content of 37% and provided water- and acetone-resistant films after thermal treatment at 160° C.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of water-resistant and solvent-resistant coated substrates which comprises
    (a) coating a heat-resistant substrate with a solution or dispersion of an anionically-modified polyisocyanate addition product in an aqueous solvent, said polyisocyanate addition product containing chemically incorporated anionic structural units corresponding to the formula

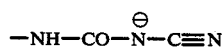

in a quantity of about 5 to 1000 milliequivalents per 100 g of solids, said solids being based on the reaction product of an organic polyisocyanate with a salt based on cyanamide and a base comprising a member selected from the group consisting of ammonia, primary and secondary amines having a minimum pKb of 3.1 which are volatile under the conditions of the thermal treatment, tertiary-amines which are volatile under the conditions of the thermal treatment and mixtures of these bases and (b) thermally treating the coated substrate at a temperature of about 60° to 200° C. with evaporation or vaporization of the aqueous solvent and cross-linking of the polyisocyanate addition product applied to the substrate.

2. The process of claim 1 wherein said solids are based on the reaction product of an organic polyisocyanate with a salt based on cyanamide and a volatile tertiary amine.

3. The process of claim 1 wherein said polyisocyanate contains biuret or isocyanurate groups.

4. An aqueous, anionically-modified polyisocyanate addition product containing anionic structural units corresponding to the formula

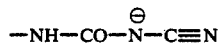

in a quantity of about 5 to 1000 milliequivalents per 100 g of solids, said solids being based on the reaction product of an organic polyisocyanate with a salt based on cyanamide and a base comprising a member selected from the group consisting of ammonia, primary and secondary amines having a minimum pKb of 3.1 which are volatile under the conditions of the thermal treatment, tertiary amines which are volatile under the conditions of the thermal treatment and mixtures of these bases.

5. The polyisocyanate addition product of claim 4 wherein said solids are based on the reaction product of an organic polyisocyanate with a salt based on cyanamide and a tertiary amine.

6. The polyisocyanate addition product of claim 4 wherein said polyisocyanate contains biuret or isocyanurate groups.

7. The polyisocyanate addition product of claim 5 wherein said polyisocyanate contains biuret or isocyanurate groups.

* * * * *